United States Patent

[11] 3,537,381

[72] Inventor Philip R. Austin
Livonia, Michigan
[21] Appl. No. 773,681
[22] Filed Sept. 16, 1968
[45] Patented Nov. 3, 1970
[73] Assignee Atmos-Tech Corporation
Edison, New Jersey
a corporation of New Jersey

[54] CIRCULAR WORK CENTER
13 Claims, 4 Drawing Figs.
[52] U.S. Cl. ..................................................... 98/115
[51] Int. Cl. ..................................................... F23j 11/00
[50] Field of Search ........................................... 98/33, 39, 43, 1, 115

[56] References Cited
UNITED STATES PATENTS
2,726,034 12/1955 Lorenzo ........................ 98/1
3,284,148 11/1966 Ramniceanu ................. 98/115
3,301,167 1/1967 Howard ........................ 98/115
3,426,512 2/1969 Nesher ........................ 98/115

Primary Examiner—Meyer Perlin
Attorney—Lawrence I. Lerner

ABSTRACT: A work bench is disclosed including a support stand on which is centered a work platform about which a plurality of workers may be stationed. The work platform includes a passageway therethrough which communicates with an enclosed plenum chamber centrally positioned on the upper surface of the work platform and also with the output of a blower situated beneath the work platform. The chamber includes upstanding side surfaces consisting of an air filtering material such that in operation, air is forced by the blower through the passageway of the work platform and into the chamber whereby it may be forced through and filtered by the side surface of the plenum chamber. The work platform is preferably circular, and overhangs the support stand therebeneath such that a maximum number of workers can be conveniently assembled about the work center. The plenum chamber situated on the work platform is of similar configuration such that a steady stream of clean air is radially blown outwardly across the work platform.

Patented Nov. 3, 1970

INVENTOR.
PHILIP R. AUSTIN
BY
ATTORNEY

INVENTOR.
PHILIP R. AUSTIN
BY
ATTORNEY

CIRCULAR WORK CENTER

This invention relates to work benches and more particularly relates to a work bench which is nonrectangular, preferably circular, in configuration whereby a maximum number of workers can be comfortably stationed about a compact blower-contained vibration-free work center.

Individual work benches are known in the prior art and generally comprise a small work bench beneath which is positioned a blower arranged to force air upward through an aperture in the rear of the work bench into a plenum chamber having a forward wall thereof constructed of air filtering material. In this manner clean air is continually blown across the work bench in the area where a worker is operating. Such work benches are customarily supported upon a pair of side table legs between which is situated the aforementioned blower system. A typical work bench of this type is shown in U.S. Pat. No. 3,336,855 issued to A. J. Messina entitled "Ultraclean Work Bench."

This type of work bench illustrated in the Messina patent and indeed other prior art linear type of work benches (so named because the forced air travels out from the plenum chamber in only one direction) suffer from many disadvantages which the instant invention effectively eliminate.

Specifically and as may be appreciated when considering the Messina type of work bench, prior art units are substantially restricted in terms of the number of workers such units can accommodate. Thus should a linear work bench be occupied by a single worker and it is decided that a plurality of workers with individual stations are necessary, the only recourse available is to crowd more workers within the confines of the side table legs of the work bench which for all practical purposes, define the maximum work bench space available. Obviously, if more work stations are necessary than can be accommodated at the forward leading edge of the work platform, the only choice is to purchase and install additional work benches. Perhaps, with a work bench such as that disclosed in the Messina patent, it might be thought possible to remove the plexiglass sides which enclose the work bench, so as to accommodate further workers along its side edges. However, it will be apparent that such a solution is impractical from the point of view that the additional workers' legs would be obstructed by the side table legs of the work bench. Furthermore, because of the linear flow of the forced air, in one forward direction only, little, if any, forced air would be blown laterally out across the work area where these additional men would be operating.

A second major disadvantage of existing work benches, is related to the distribution of forced air, (or other gases being utilized) from within the plenum chamber across the work area where the operator is situated. Thus as forced air comes up into the plenum chamber from the blower beneath the work platform, by far, the greatest proportion thereof is immediately forced through the forward filtering wall at its lower end thereof and very little air ever reaches the upper region so as can be blown out the top most portion of the plenum chamber. This is especially unsatisfactory in situations where the worker happens to be assembling or operating on equipment having a substantial height above the work platform; for the upper extremities of such work piece will not be blown free of dirt particles and other contaminants—the very function of a blower contained work bench.

In contradistinction, the instant invention eliminates the above noted drawbacks, by providing a work station which can comfortably accommodate an increased number of workers at a plurality of individual work stations. Furthermore, and because of the novel configuration of the work center of the instant invention, the number of work stations available is a variable depending only on the type of work being performed. Thus, and as will be shown in greater detail, the instant invention comprises a work center having an enlarged work platform, preferably circular, situated upon a similarly shaped support stand having a smaller cross-sectional area. Considering for example a circular work platform situated above a smaller cylindrical support stand, it will be appreciated that a plurality of workers can be conveniently seated or situated around the work table, the number of which would depend only upon the particular amount of space necessary for each worker. Further, and in accordance with the instant invention, a similarly shaped enclosed plenum chamber is centrally located on the work platform with its upstanding side surfaces being constructed of air filtering material. The interior of the plenum chamber communicates with the output port of a blower positioned beneath the work platform within the confines of the cylindrical support stand such that a steady stream of clean forced air is blown radially out from the plenum chamber in all directions across the entire work surface area defined by the exposed upper surface of the work platform. Therefore, and regardless of the number of workers who happen to be situated at the work center, a constant supply of clean fresh air is available for all.

In a preferred embodiment of the instant invention, the top end of the plenum chamber is enclosed by a dome having the same under surface cross-sectional area as the exposed upper surface of the work platform. The under surface of the dome is provided with a plurality of service stations comprising for example lighting fixtures, outlets, and/or any other facilities necessary for the operations being performed about the work center.

As noted previously, a drawback inherent in prior art air blown work benches stems from the unequal distribution of air flowing through the filtering forward wall of the plenum chamber. To eliminate this problem, the instant invention, in a preferred embodiment, utilizes an elongated hollow tube positioned within the plenum chamber directly above the passageway which receives the forced air from the blower. The hollow tube includes radially distributed apertures along its length with such apertures being graduated in diameter with smallest diameter apertures existing closest to the surface of work table. In this manner the natural tendency for the air to disburse immediately upon entering into the plenum chamber is prevented and instead a uniform distribution of air is radially established along the entire length of the plenum chamber.

Accordingly it is an object of the instant invention to provide an air blown work center which maximizes the total work surface area available and which can comfortably accommodate a plurality of workers, the number of which depends only upon the type of work being performed and space requirement of each.

Another object of the instant invention is to provide such a work center which includes enlarged, preferably circular, work platform which is supported upon a similarly shaped but smaller diametered support stand in such a manner that a plurality of workers can be situated around the work center in noninterfering relationship with one another and with respect to the support stand.

Still another object of the instant invention is to provide such an enlarged, preferably circular, work platform supported upon a similarly shaped but smaller support stand and which further includes a corresponding shaped plenum chamber above the work platform which chamber includes upstanding side walls thereof constructed of an air filtering material.

Yet another object of the instant invention is to provide such a work center wherein the aforementioned plenum chamber communicates, through the said work platform, with a blower positioned beneath the platform such that a continuing stream of clean, forced air is blown radially through the walls of the plenum chamber and across the exposed upper surface of the work platform.

Yet another object of the instant invention is to provide such a work station wherein the aforementioned plenum chamber is sealed at its upper end thereof with a dome structure having a similar cross-sectional area as the work platform therebeneath whereby a plurality of service centers may be conveniently located around the under surface of the dome.

Another object of the instant invention is to provide such a work station which includes an elongated apertured tube within the aforementioned plenum chamber to uniformly distribute forced air along the entire length of the plenum chamber.

These and other objects of the instant invention, and a further understanding thereof, may be had by referring to the following description and drawings in which.

Figure 1:
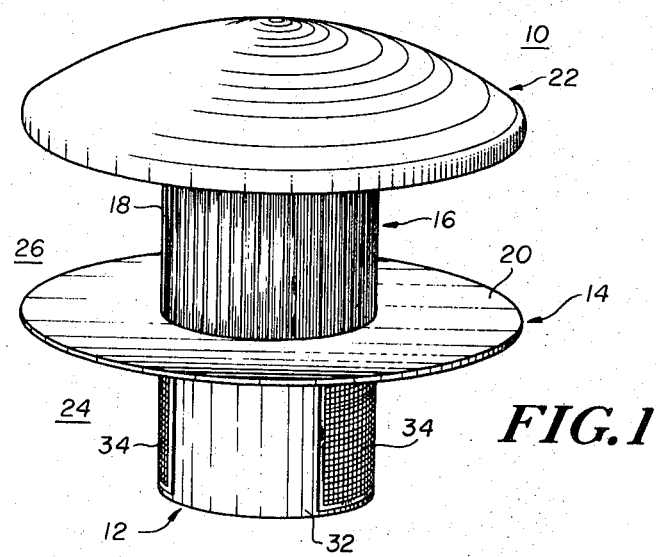
FIG. 1 is a perspective view of the work center of the instant invention.

Turning to FIG. 1 there is shown the work center 10 of the instant invention. Basically the work center 10 includes a support stand 12 on which is centrally supported a work platform 14 adapted to accommodate a plurality of workers thereabout, the number of which depending only upon the space requirements for each.

Supported centrally upon the work platform 14 is a similarly shaped, in this case cylindrical, plenum chamber the upstanding wall surfaces 18 of which are constructed of an air (or other gas) filtering material. As will be explained in greater detail, the interior of the plenum chamber 16 communicates with a blower located within the support stand 12 such that air forced into the chamber 16 will be distributed radially across the exposed upper surface 20 of the work platform 14, to cleanse work pieces situated thereon.

Figure 2:
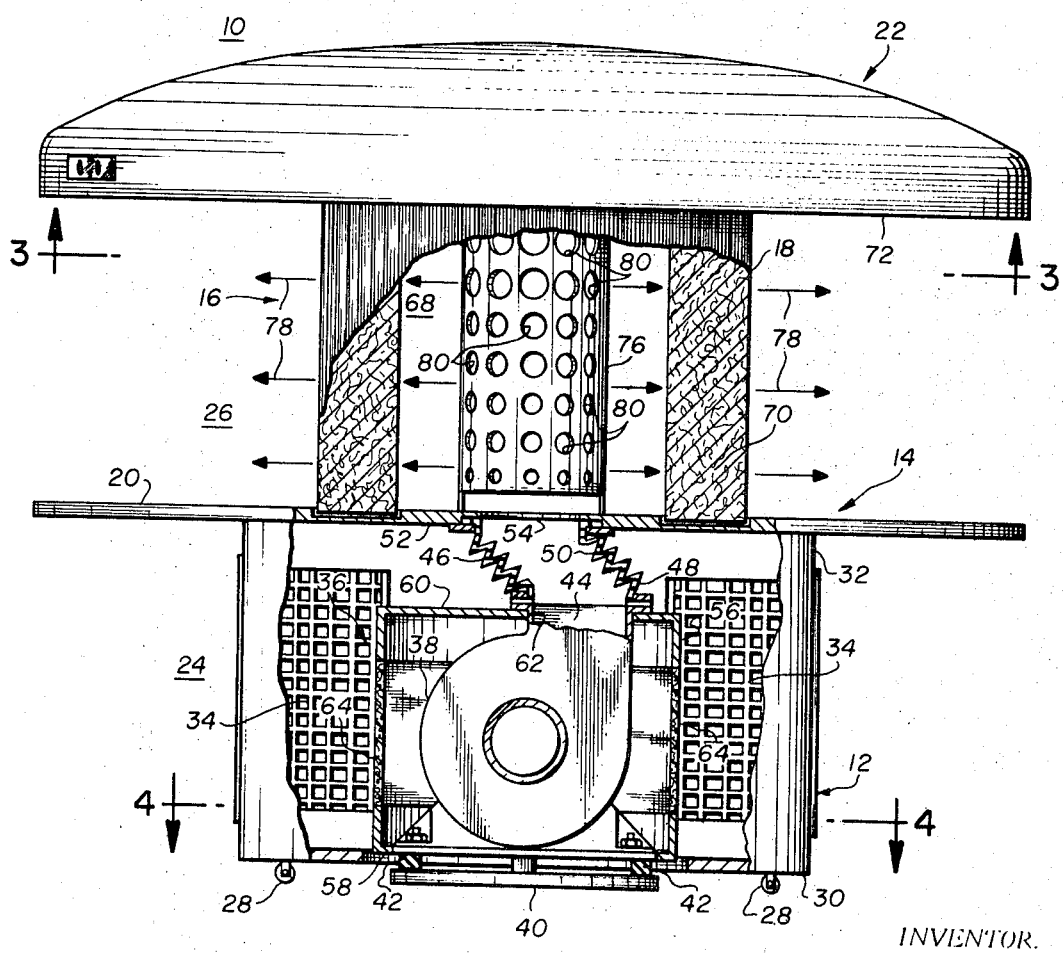
FIG. 2 is a front view, partially in section, of the work center of FIG. 1.

As best illustrated in FIG. 2, the upper end of plenum chamber 16 is sealed by a dome 22 having the same configuration and approximately the same cross-sectional area (across its largest plane) as the work platform 14.

It is to be appreciated that although, in the preferred embodiment, the components such as the support stand 12, the work platform 14, plenum chamber 16 and the dome 22 are illustrated as having a circular configuration, the instant invention is not to be limited thereby. Thus broadly speaking, it is a basic contribution of the instant invention that the work platform 14 overhang or extend beyond the perimeters of the components immediately beneath and above the platform 14 thereby compactly defining leg space 24 and work space 26 all the way around the work platform 14 such that a significantly larger number of workers can be accommodated at work center 10 than is possible with linear work centers of the prior art. Thus although the invention is illustrated with circular components, its teachings can be carried out using other shapes, such as an elongated oval, an enlarged square, or rectangle, the only requirements being (1) that an overhang is established around the entire support stand and (2) that the blower being utilized is of sufficient strength to present the desired intensity of forced air at a point which is radially furthermost from the center of the plenum chamber 18. (Thus if an oval shape were being utilized for the work platform 14 and plenum chamber 18, a worker positioned at the major axis of the work platform would be further from the air source than a man positioned at the minor axis).

Figure 4:
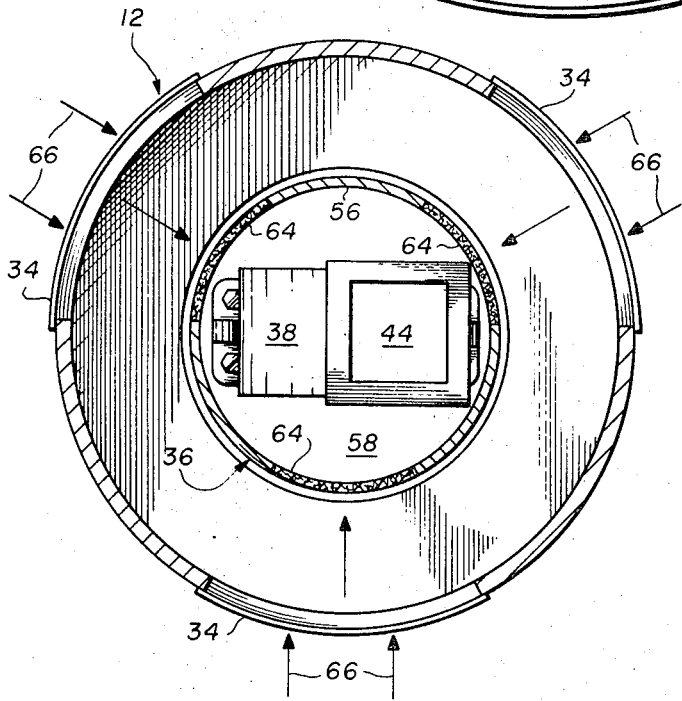
FIG. 4 is a plan view of the work center of the instant invention taken along the arrows 4–4 of FIG. 2.

Turning to FIG. 2, there is illustrated in greater detail, the work center 10 of FIG. 1. The support stand 12 is preferably provided with casters 28 around the perimeter of its lower end 30 such that the entire work station can be conveniently moved about the floor surface upon which it sits. The opposite end 32 of the support stand 12 carries the work platform 14 rigidly secured thereto. As best seen in FIGS. 1 and 4, the support stand 12 includes a plurality of intake vent areas or grills 34 around the perimeter thereof.

Positioned within support stand 12 and generally centrally thereof, is the blower arrangement 36 including a blower 38 resiliently supported on a base or stand 40 by means of rubber cushions 42. Connected to the output port 44 of the blower 38 is an expansible bellows 46 one end 48 of which is connected to the output port 44 and the opposite end 50 of which is secured to the under surface 52 of the work platform 14 in communicating relationship with respect to a central aperture 54 therethrough.

Immediately surrounding the blower 38 is a sealed housing 56 joined at its lower end 58 thereof to the bottom of the blower 38 and provided on its upper surface 60 thereof with an aperture 62 which is sealingly joined to the juncture of the bellows 46 and the output port 44 of the fan 38.

With this arrangement it may be seen that the blower 38 is mechanically isolated from the support stand 12 and table 14 such that the entire work center 10 is virtually vibration free.

As best illustrated in FIG. 4, the housing 56 is provided with a plurality of filter areas 64, substantially aligned with the intake areas or grills 34, provided in the support stand 12. The function of the filter areas 64 is to prefilter, that is, partially clean the air which is sucked in through the grills 34 by the blower 38 as illustrated by the arrows 66 in FIG. 4.

Returning to FIG. 2, secured on the upper surface 20 of the work platform 14, is the cylindrical plenum chamber 16 the hollow interior 68 of which may be said to be in communicating relationship with passageway 54 in the work platform 14 as noted previously. The cylindrical side walls 18 of the plenum chamber 16 are constructed of an air filtering material shown in cross section at 70 in FIG. 2. Although in no way limited by such disclosure, the particular filter material chosen for the system of the instant invention comprises what is commonly known as an absolute filter material comprising for example a small percentage of asbestos fibers mixed with ceramic and having excellent filtration properties (99.90 percent retention of 0.3 micron particles).

Figure 3:
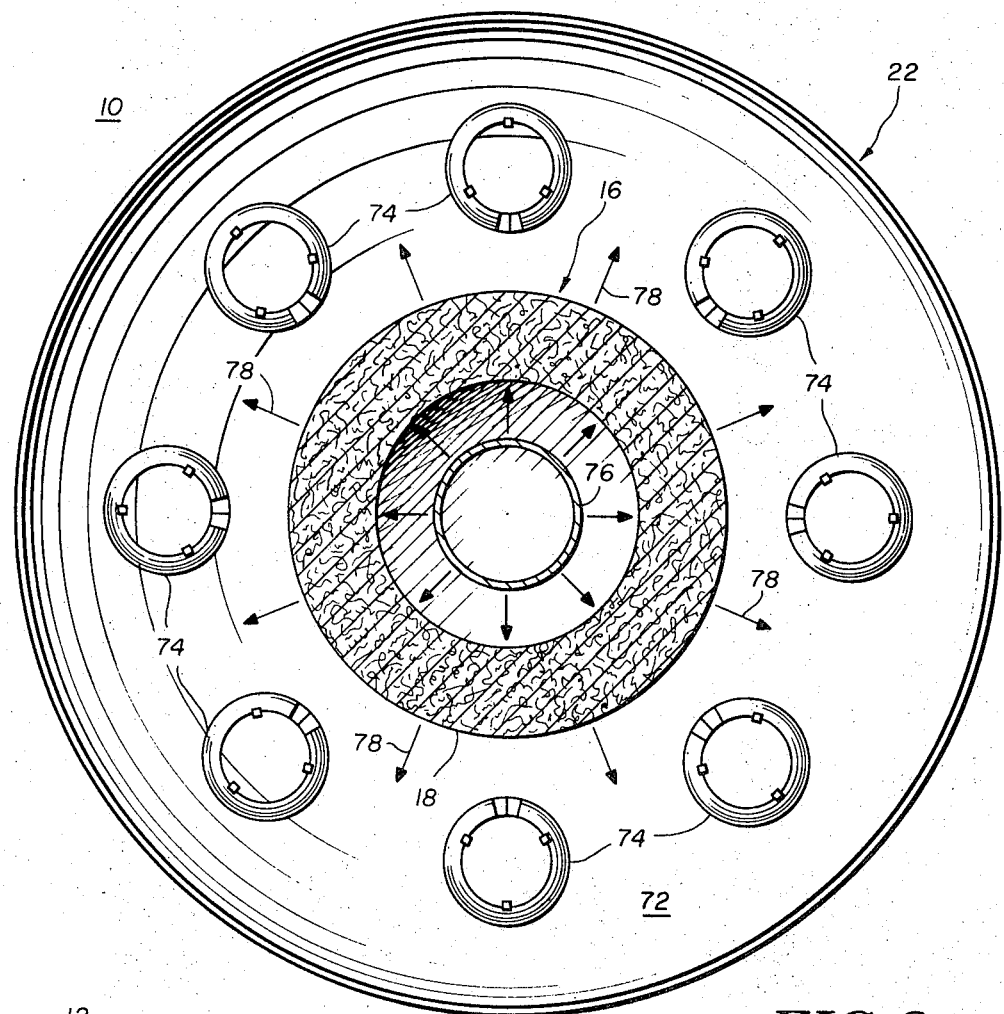
FIG. 3 is a plan view taken along the arrows 3–3 of FIG. 2.

Sealing the upper end of the plenum chambers 16 is the dome 22 having an under surface 72 (see FIG. 3) of approximately the same cross-sectional area as the upper surface 20 of the work platform 14. As best seen in FIG. 3, the under surface 72 is provided with a plurality of service centers 74 therearound, the number of which corresponds to the maximum number of workers which might be anticipated for the work center 10. Such service stations 74 might include for example lighting fixtures, electrical outlets, and/or any other facilities which might be utilized by the workers situated therebeneath.

Disregarding for the time being a cylindrical tube 76 (the function of which will be described below) located within the plenum chamber 16, operation of the work center 10 is as follows.

With the fan 38 operating, air is sucked in through the grills 34 of the support stand 12; prefiltered by the filter areas 64 of the enclosure 56; and then forced through the bellows 46 into the interior 68 and finally through the absolute filter material 70 whereby a steady stream of highly filtered air (Illustrated by the arrows 78 in FIG. 2) is blown radially out across the exposed upper surface 20 of the work platform 14. In this manner, dirt and other contaminants which accumulate on the work platform 14 are continually blown free of the apparatus being worked on by the workers stationed at the center 10.

As suggested previously, prior art work benches have included filtering plenum chambers through which a stream of blown air is forced. In addition to the physical accommodation problem associated with the prior art rectangular work benches, such prior work benches suffer from the fact that there is an unequal air distribution along the length of the plenum chambers thereof. Thus it will be appreciated, that even in the instant invention, without the tube 76, there would be a tendency for a great proportion of the air emanating from the aperature 54 to immediately disburse radially out of the lower perimeter area of the plenum chamber 16 resulting in little, if any, air ever reaching the upper areas of the chamber 16. This can be a serious problem in the event workers are assembling machines or other apparatus having substantial height above the surface of the work table 14 since little forced air will be available to cleanse the upper portions of such apparatus. To eliminate this problem the instant invention locates a hollow apertured tube 76 immediately above the opening 54 in the work table 14 so as to receive the forced air being passed therethrough. As illustrated in FIG. 2, the aperatures 80 around the tube 76 are graduated in diameter, with the smallest diametered aperatures closest to the aperature 54. Thus as the air emanates from the aperature 54 into the interior of the tube 76, the relatively small apertures immediately adjacent thereto will restrict the flow of air radially out therefrom with the remainder of the air passing upwardly along the inside of the tube 76 to be gradually and uniformly distributed along its entire length thereof. Thus as suggested by the equal length of the arrows 78 in FIG. 2, a relatively uniform air distribution pattern is established along the entire height of the plenum chamber 16.

Thus there has been described a vibration-free air-blown work center of preferably circular, configuration whereby the number of workers who can be comfortably stationed in front of a steady stream of filtered air is maximized. Additionally, means are provided to assure a uniform distribution of air along the entire length of the plenum chamber of such work station.

Although this invention has been described with respect to its preferred embodiments, it should be understood that many variations and modifications will now be obvious to those skilled in the art, and it is preferred, therefore, that the scope of the invention be limited, not by the specific disclosure herein, only by the appended claims.

I claim:

1. A work bench comprising:
    a support stand, said support stand having a first predetermined perimeter to occupy a first cross-sectional area of floor space;
    a work platform positioned on said support stand, said work platform having a second predetermined perimeter to define a second cross-sectional area larger than said first cross-sectional area;
    an enclosed chamber positioned on said work platform, said chamber being formed by an absolute filter, said chamber having a third perimeter defining a third cross-sectional area less than said second cross-sectional area, and including upstanding side surfaces of air filtering material;
    air distribution means cooperating with said enclosed chamber for uniformly distributing air along the length of said chamber; and
    blower means in communicating relationship with said chamber and air distribution means for forcing air into said chamber and out said surfaces thereof.

2. The work bench of claim 1 wherein said first predetermined perimeter of said support stand, said second predetermined perimeter of said work platform and said third perimeter of said chamber are circular.

3. The work bench of claim 2 wherein said chamber is enclosed at its upper end by a circular dome having the same cross-sectional area as said work platform.

4. The work bench of claim 3 wherein said dome includes an under surface thereof which faces the upper surface of said work platform, said under surface including a plurality of service centers spaced thereabout to service a plurality of workers situated around said work platform.

5. The work bench of claim 2 wherein said work platform includes a passageway therethrough and said blower means is positioned beneath said work platform in communicating relationship with said passageway.

6. The work bench of claim 5 wherein said air distribution means includes a hollow cylindrical tube means positioned within said chamber directly above said passageway for receiving air forced through said passageway by said blower means, said tube means including apertures therearound, along its length thereof.

7. The work bench of claim 6 wherein said blower means is resiliently supported beneath said work platform in physical isolation with respect to said support stand and said work platform; and further including hollow bellows means joining the output of said blower means to said passageway.

8. The work bench of claim 7 wherein said blower means is enclosed within a housing including at least one prefilter area as a side wall thereof, said housing located within said first predetermined perimeter of said support stand.

9. The work platform of claim 8 wherein said support stand comprises a cylindrical shell having at least one grill area therein to permit the intake of air by said blower means.

10. The work bench of claim 2 wherein said chamber is enclosed at its upper end thereof by a circular dome having the same cross-sectional area as said work platform, and wherein said dome includes an undersurface thereof which faces the upper surface of said work platform, said under surface including a plurality of service centers spaced thereabout to service a plurality of workers situated around said work platform.

11. The work bench of claim 10 wherein said air distribution means includes a hollow cylindrical tube means positioned within said chamber directly above said passageway for receiving air forced through said passageway by said blower means, said tube means including apertures therearound, along its length thereof, said apertures being graduated in diameter with the smallest diameter apertures located adjacent said passageway, whereby there will be a uniform distribution of air through said side surfaces of said enclosure.

12. The work bench of claim 1 wherein said air distribution means comprises a hollow cylindrical tube positioned within said enclosed chamber, one end said tube receiving said forced air, said tube including apertures therearound, along its length thereof, said apertures being graduated in diameter with the smallest diametered apertures located closest to said end of said tube which receives said forced air.

13. The work bench of claim 12 wherein said work platform includes a passageway therethrough and said blower means is positioned beneath said work platform in communicating relationship with said passageway, said one end of said tube receiving said forced air from said passageway.